A. D. SUNDEEN.
TRANSMISSION GEARING.
APPLICATION FILED MAY 25, 1915.

1,173,059.

Patented Feb. 22, 1916.
2 SHEETS—SHEET 1.

Witnesses
W. S. McDowell
R. M. Smith

Inventor
Alfred D. Sundeen
By Victor J. Evans
Attorney

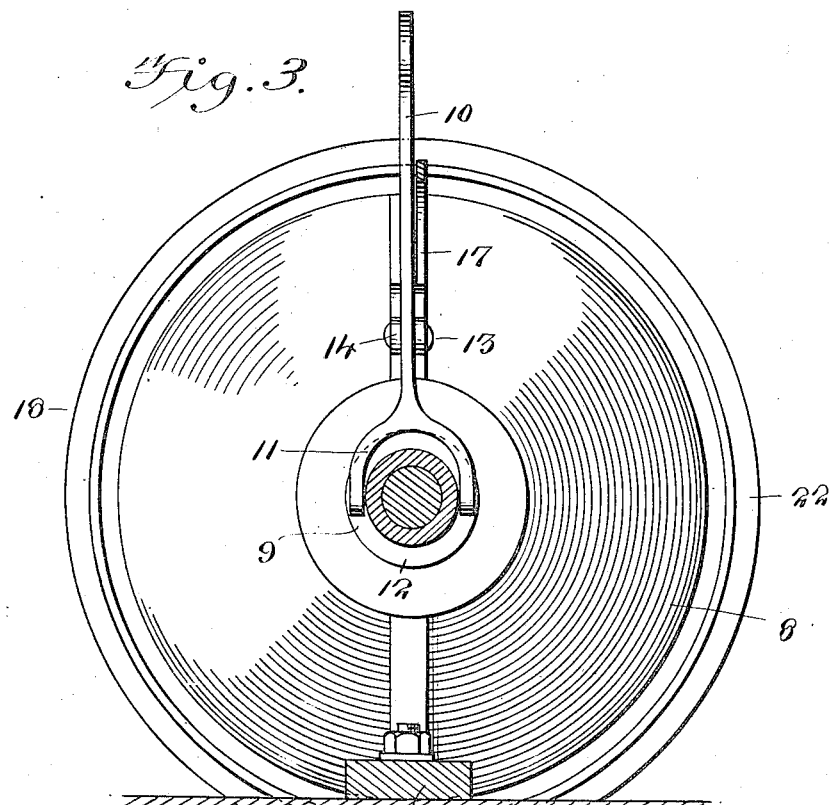
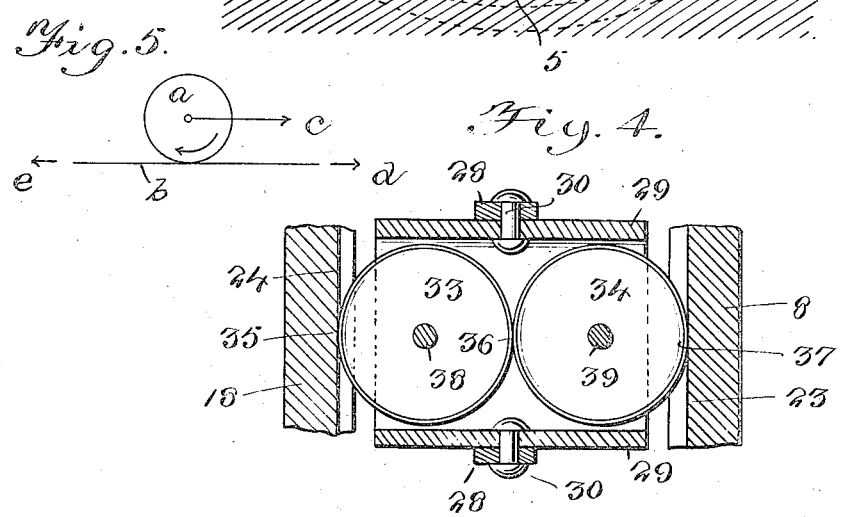

UNITED STATES PATENT OFFICE.

ALFRED D. SUNDEEN, OF PHILADELPHIA, PENNSYLVANIA, ASSIGNOR OF ONE-THIRD TO EMANUEL SUNDEEN, OF PHILADELPHIA, PENNSYLVANIA.

TRANSMISSION-GEARING.

1,173,059.   Specification of Letters Patent.   Patented Feb. 22, 1916.

Application filed May 25, 1915. Serial No. 30,412.

*To all whom it may concern:*

Be it known that I, ALFRED D. SUNDEEN, a citizen of the United States, residing at Philadelphia, in the county of Philadelphia and State of Pennsylvania, have invented new and useful Improvements in Transmission-Gearing, of which the following is a specification.

This invention relates to transmission gearing, the object in view being to produce simple gearing of the class described by means of which the relative speeds of the driving and driven members may be varied as well as the relative direction of rotation of the said driving and driven members, at the same time producing a wide differentiation in the speed of said members when the driven member is turning in either direction, the change of speed and the change of direction of the driven member being accomplished instantly and by simple means and the mechanism as a whole being reliable in operation and of durable construction.

With the above and other objects in view, the invention consists in the novel construction, combination and arrangement of parts, as herein described, illustrated and claimed.

Figure 1:
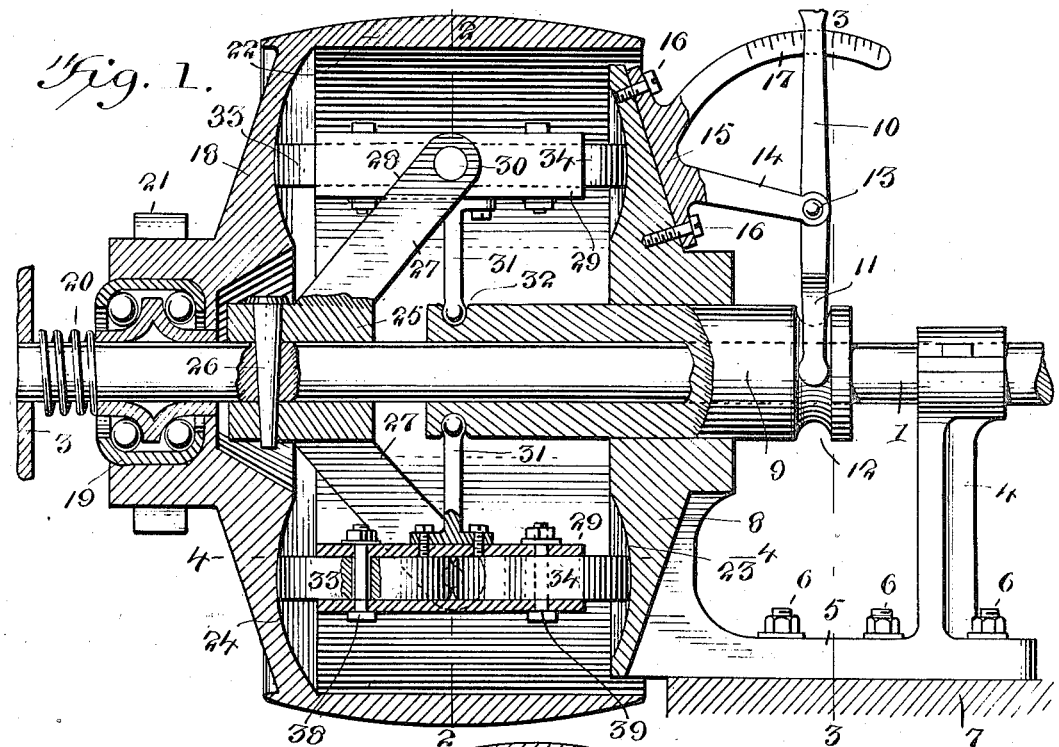
Figure 2:
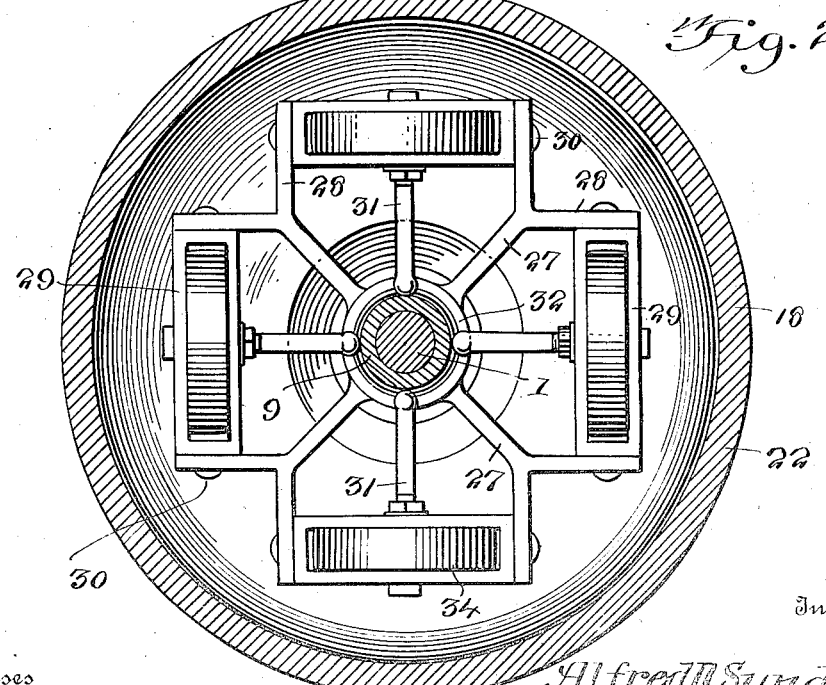

In the accompanying drawings:—Figure 1 is a sectional view partly in elevation of the transmission gearing, taken about in line with the driving shaft. Fig. 2 is a cross section through the same on the line 2—2 of Fig. 1. Fig. 3 is a section approximately on the line 3—3 of Fig. 1. Fig. 4 is a section on the line 4—4 of Fig. 1. Fig. 5 is a small diagrammatic view illustrative of the action of the transmission gearing.

The driving member 1 is shown in the form of a rotary shaft the same being shown as mounted in bearings 2 and 3, the bearing 2 being supported by a post 4 extending from a base frame 5 bolted at 6 to a suitable support 7.

8 designates what is hereinafter termed the stationary member which is in the form of a disk rigidly connected to or formed integrally with the stationary base 5, the member 8 being therefore non-rotating. The stationary member 8 forms a bearing for a sleeve 9 which surrounds the shaft 1 and is slidable longitudinally thereof, said sleeve being shifted by means of a speed controlling and reversing lever 10 shown as provided with a fork 11 engaging a groove 12 in the sleeve 9, said lever being fulcrumed at 13 on a bracket or arm 14 extending from a base 15 fastened to the stationary member 8 at 16 and provided with a curved graduated arm 17 over which the lever 10 is adapted to sweep for the purpose of adjusting the tilting carriers hereinafter described. The driven member designated at 18 is also substantially in the form of a disk, resembling the stationary member 8 and is mounted to turn loosely on the shaft, a combined radial and end thrust ball bearing 19 being preferably employed to reduce friction as far as possible. The driven member 18 is also slidable to a slight extent longitudinally of and upon the shaft 1 and is pressed toward the stationary member 8 by means of a thrust spring 20 shown as coiled around the shaft 1.

The driven member 18 is shown as provided with a gear face 21 and also with a rim 22 which forms a housing for the transmission mechanism hereinafter particularly described and may also form a belt face the same being preferably curvilinear or convex in cross section as shown in Fig. 1.

The stationary member 8 is provided with a working face 23 which as shown in Fig. 1 is concave in cross section and the driven member 18 is likewise provided with a corresponding concaved working face 24 opposed to the working face 23, both of said working faces being described on the arc of a circle of which the pivotal mounting of the transmission wheel carriers hereinafter described is a center, the purpose of which will presently appear.

Fast on the shaft 1 is a yoke or spider illustrated in Figs. 1 and 2, said spider comprising a body portion or hub 25. This may be fastened to the shaft 1 in any desired manner, the same being shown as fastened to the shaft 1 by means of a pin or key 26. As shown in Fig. 2 the spider or yoke 25 is provided with radially extending arms 27 each of which is bifurcated at its outer extremity to provide outwardly diverging fork arms 28, four sets of said fork arms being illustrated in the drawings although the number thereof may be increased or diminished at the will of the manufacturer. Transmission wheel carriers or frames 29 are pivotally mounted between adjacent fork arms 28 by means of the pivots 30 and each of said tilting carriers is provided with an inwardly extending arm 31 the inner end of which is shown as engaging in a groove 32 in the sleeve 9 hereinabove referred to. Therefore, as the sleeve 9 is moved longitudinally of the shaft 1 it coöperates with the arms 32 to simultaneously and equally tilt all of the carriers 29 on their pivots 30.

Each of the carriers 29 contains a pair of transmission wheels 33 and 34, one of said wheels rolling against the working face 23 of the stationary member 8 and the other wheel contacting with the working face 24 of the driven member 18. This is clearly shown in Fig. 4. The wheels 33 and 34 also work in driving contact with each other so that there is a complete line of driving contact between the stationary member 8 and the driven member 18 indicated in Fig. 4 at the points 35, 36 and 37. The wheels 33 and 34 are shown as journaled on shafts 38 and 39 supported by the frame of the carrier 29. The working faces 23 and 24 are described on the arc of a circle of which each pivot 30 is the center and, therefore, it matters not in which direction the carriers 29 are inclined or tilted, the wheels 33 and 34 are always in coöperative contact with the working faces 23 and 24.

As previously stated, the carriers 29 are tilted by means of the lever 10 and the interposed connections described, enabling said carriers to be simultaneously and equally tilted in either direction. When the carriers are in the position shown in Fig. 1 or substantially parallel to the shaft 1, there is no driving action on the driven member 18. When the carriers are tilted in one direction, the driven member 18 is propelled in a clockwise direction. When the carriers are tilted in the opposite direction, the driven member 18 is caused to revolve in an anti-clockwise direction. The greater the extent to which the carriers are tilted in either direction, the greater the speed imparted to the driven member 18 in either direction in accordance with the angle to which the carriers are tilted.

The operation above referred to may be more clearly understood by reference to the diagrammatic view, Fig. 5. Let $a$, for example, represent the transmission wheel which contacts with the driven member indicated at $b$. Suppose the wheel $a$ to be moving in the direction of the arrow $c$ at the rate of four feet per second and the surface or peripheral speed of the wheel $a$ to be four feet per second. It is obvious that the wheel $a$ will roll along the surface of $b$ without in any way affecting the latter.
Suppose now that the wheel $a$ is being moved in the direction of the arrow $c$ at the same rate of speed, four feet per second, and that the wheel $a$ is being driven at a surface speed of only three feet per second.
In such case there will be a drag between the wheel $a$ and the surface $b$ causing the surface $b$ to move in the direction of the arrow $d$ at a rate of one foot per second. Suppose, now, that the wheel $a$ is being drawn in the direction of the arrow $c$ at the same rate of speed, viz., four feet per second, and that the wheel $a$ is being driven at a surface or peripheral speed of five feet per second. As the surface speed $a$ is one foot per second greater than the speed of the axis of the wheel in the direction of the arrow $c$, the surface $b$ will be driven in the direction of the arrow $e$. The wheel $a$ in the diagram, Fig. 5, corresponds with the wheel 33 of Fig. 1 and the speed of this wheel 33 is always the same as the speed of the wheel 34, but the speed of the last named wheel varies in accordance with the point of contact between said wheel 34 and the stationary member 8, it being obvious that when the carriers 29 are tilted in one direction, the contact point between each wheel 34 and the stationary member 8 will move outward toward the periphery of the member 8 or inwardly toward the center thereof thereby increasing or diminishing the length or circular course of travel of the wheel 34 in relation to the working surface 23 of the stationary member 8. When the wheel 34 contacts with the working surface 23 near the periphery of the member 8, a greater number of revolutions will be imparted to the wheel 34 in one complete rotation of the shaft 1 than when said wheel 34 is at the central point shown in Fig. 1 and when the wheel 34 contacts with the working face 23 of the member 8 nearer to the center thereof, the wheel 34 will revolve a lesser number of times in each revolution of the shaft 1.
It will, therefore, be understood that while the speed of the shaft 1 may be constant, the speed of the wheel 34 varies as the contact point thereof moves toward the outer or inner portion of the working face 23 of the stationary member 8. As the speed of the wheel 33 depends on that of the wheel 34, both being preferably of the same diameter and therefore revolving at the same speed, the speed of the wheel 33 is accelerated or reduced in accordance with the speed of the wheel 34. Thus the speed may be increased very rapidly from the central or neutral point in either direction and the driven member 18 may be reversed or driven in opposite directions by moving the contact point between the wheel 33 and the working face 24 of the driven member 18 to either side of the central or neutral contact point in which position the parts are shown in Fig. 1.

While I have shown four sets of transmission wheels 33 and 34 and with the like number of carriers therefor in the drawings, it will, of course, be apparent that more or less sets of wheels and carriers therefor may be provided in accordance with the desire of the manufacturer and the amount of power to be transmitted by means of the mechanism described. The wheels 33 and 34 preferably have their working faces convex as shown to correspond with the concaved working faces 23 and 24 of the stationary and driven members thus giving increased frictional contact between the transmission wheels where they contact with each other and with the working faces of the stationary and driven members. The power imparted to the driven member 18 may be delivered therefrom by the gear face 21 or the belt face 22 or in any other way found expedient, the main object of this invention being to provide means for driving the driven member in either direction and at different speeds in either direction and also to obtain a neutral point at which the driven member will remain stationary. A slight movement of the speed controlling and reversing lever 10 in one direction or the other will cause the driven member 18 to revolve in a corresponding direction and by moving the lever 10 across the center of the graduated arm 17, the direction of rotation of the driven member 18 is immediately reversed. To facilitate the shifting of the lever 10 and the tilting of the carriers 29, any suitable means may be employed for slightly moving the driven member 18 out of driving contact with the wheels 33, the spring 20 subsequently serving to press the driving member 18 again into driving contact with said wheels 33 and establish the necessary driving pressure between the members 8, 18, 33 and 34.

What I claim is:—

1. In transmission gearing, the combination of a driving shaft, a stationary member having an annular working face, a rotary driven member also having an annular working face opposed to the working face of the stationary member, and a pair of transmission wheels the working faces of which contact with each other and with the working faces of the stationary and driven members, said wheels being carried by the driving shaft.

2. In transmission gearing, the combination of a driving shaft, a stationary member having an annular working face concaved in cross section, a rotary driven member also having an annular working face concaved in cross section and opposed to the working face of the stationary member, and a pair of transmission wheels the working faces of which contact with each other and with the working faces of the stationary and driven members, said wheels being carried by the driving shaft.

3. In transmission gearing, the combination of a driving shaft, a stationary member having an annular working face, a rotary driven member also having an annular working face opposed to the working face of the stationary member, a pair of transmission wheels the working faces of which contact with each other and with the working faces of the stationary and driven members, and a carrier for said wheels carried by the driving shaft.

4. In transmission gearing, the combination of a driving shaft, a stationary member having an annular working face, a rotary driven member also having an annular working face opposed to the working face of the stationary member, a pair of transmission wheels the working faces of which contact with each other and with the working faces of the stationary and driven members, a carrier for said wheels carried by the driving shaft, and means for tilting said carrier.

5. In transmission gearing, the combination of a driving shaft, a stationary member having an annular working face, a rotary driven member also having an annular working face opposed to the working face of the stationary member, a pair of transmission wheels the working faces of which contact with each other and with the working faces of the stationary and driven members, a yoke fast on said driving shaft, a tilting wheel carrier pivotally supported and carried by said yoke, and means for tilting said carrier.

6. In transmission gearing, the combination of a driving shaft, a stationary member having an annular working face, a rotary driven member also having an annular working face opposed to the working face of the stationary member, a pair of transmission wheels the working faces of which contact with each other and with the working faces of the stationary and driven members, a yoke fast on said driving shaft, a tilting wheel carrier pivotally supported and carried by said yoke, an arm extending from said carrier, and a sleeve slidable on said shaft and coöperating with the carrier arm to tilt the carrier.

7. In transmission gearing, the combination of a driving shaft, a stationary member having an annular working face, a rotary driven member also having an annular working face opposed to the working face of the stationary member, said driven member being shiftable toward and away from the stationary member, and a pair of transmission wheels the working faces of which contact with each other and with the working faces of the stationary and driven members, said wheels being carried by the driving shaft.

8. In transmission gearing, the combination of a driving shaft, a stationary member having an annular working face, a rotary driven member also having an annular working face opposed to the working face of the stationary member, said driven member being shiftable toward and away from the stationary member, a pair of transmission wheels the working faces of which contact with each other and with the working faces of the stationary and driven members, said wheels being carried by the driving shaft, and a thrust spring acting to press the driven member toward the stationary member.

In testimony whereof I affix my signature in presence of two witnesses.

ALFRED D. SUNDEEN.

Witnesses:
WM. C. SMITH,
H. C. BAUER.